US009049004B2

(12) United States Patent
Kang et al.

(10) Patent No.: US 9,049,004 B2
(45) Date of Patent: Jun. 2, 2015

(54) LOW-POWER ENCRYPTION APPARATUS AND METHOD

(71) Applicant: Electronics and Telecommunications Research Institute, Daejeon (KR)

(72) Inventors: Jun-Ki Kang, Daejeon (KR); Sang-Han Lee, Daejeon (KR); Bong-Soo Lee, Daejeon (KR); Seok Ryu, Daejeon (KR); Jung-Chul Ahn, Daejeon (KR); Jung-Gil Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/930,860

(22) Filed: Jun. 28, 2013

(65) Prior Publication Data
US 2014/0153725 A1    Jun. 5, 2014

(30) Foreign Application Priority Data

Nov. 30, 2012    (KR) .................. 10-2012-0138388

(51) Int. Cl.
| | | |
|---|---|---|
| H04L 9/00 | (2006.01) | |
| H04L 9/06 | (2006.01) | |
| G09C 1/00 | (2006.01) | |

(52) U.S. Cl.
CPC .......... *H04L 9/0618* (2013.01); *H04L 2209/04* (2013.01); *G09C 1/00* (2013.01); *H04L 9/003* (2013.01); *H04L 2209/805* (2013.01)

(58) Field of Classification Search
CPC ............. H04L 9/08; H04L 9/30; H04L 9/083; H04L 9/12; H04L 9/0618; H04L 9/0625; H04L 2209/12; H04L 2209/122; H04L 2209/04; G06F 21/10; G06F 21/72

USPC ............................. 380/277; 705/71; 713/171
See application file for complete search history.

(56) References Cited

U.S. PATENT DOCUMENTS

| | | | | |
|---|---|---|---|---|
| 7,610,628 B2 * | 10/2009 | Fischer et al. | ................. | 726/26 |
| 2001/0053220 A1 * | 12/2001 | Kocher et al. | ................. | 380/29 |

(Continued)

FOREIGN PATENT DOCUMENTS

| | | |
|---|---|---|
| KR | 10-0737171 B1 | 7/2007 |
| KR | 10-0834096 B1 | 6/2008 |
| KR | 10-2011-0008418 A | 1/2011 |

OTHER PUBLICATIONS

Deukjo Hong et al., "HIGHT: A New Block Cipher Suitable for Low-Resource Device," Workshop on Cryptographic Hardware and Embedded Systems, 2006.

*Primary Examiner* — Eleni Shiferaw
*Assistant Examiner* — Gregory M Elmore
(74) *Attorney, Agent, or Firm* — LRK Patent Law Firm (57) ABSTRACT

A low-power encryption apparatus and method are provided. The low-power encryption apparatus includes a mask value generation unit, a mask value application unit, a round key application unit, a mask operation unit, a shift operation unit, and a shift operation correction unit. The mask value generation unit generates a mask value M having the same bit length as input round function values. The mask value application unit generates first masking round function values by applying the mask value M. The round key application unit generates second masking round function values by applying round key values. The mask operation unit generates third masking round function values by performing a mask addition operation. The shill operation unit generates fourth masking round function values by performing a circular shift operation. The shift operation correction unit generates output round function values by performing an operation using the mask value M.

10 Claims, 5 Drawing Sheets

(56) References Cited

U.S. PATENT DOCUMENTS

2004/0071288 A1* 4/2004 Romain et al. .................. 380/37
2005/0232430 A1 10/2005 Gebotys
2006/0256963 A1 11/2006 Gebotys
2010/0014664 A1* 1/2010 Shirai et al. .................... 380/44
2011/0013767 A1 1/2011 Kim et al.
2011/0228928 A1* 9/2011 Trichina .......................... 380/28

* cited by examiner

LOW-POWER ENCRYPTION APPARATUS AND METHOD

CROSS REFERENCE TO RELATED APPLICATION

This application claims the benefit of Korean Patent Application No. 10-2012-0138388, filed on Nov. 30, 2012, which is hereby incorporated by reference in its entirety into this application.

BACKGROUND OF THE INVENTION

1. Technical Field

The present invention relates generally to a low-power encryption apparatus and method and, more particularly, to a low-power encryption apparatus and method that can convert the intermediate operation values of a low power encryption algorithm into random numbers, thereby providing an encryption algorithm that is secure from differential power analysis attacks.

2. Description of the Related Art

Block ciphers are core components that are most widely used in encryption applications that enhance the security of communication and stored data in a variety of types of devices, and function to provide confidentiality by encrypting data on a specific length (64-bit, or 128-bit) basis. Furthermore, block ciphers are used for a hash function, a message authentication code, a random number generator, etc. In accordance with these uses, block ciphers should be designed to be suitable for the characteristics of devices and encryption applications, and are implemented as software that is run by chips specific to the devices or the central processing units (CPUs) of the devices.

Meanwhile, as an attack against block ciphers, an attack method called a side-channel analysis attack was introduced by Paul Kocher in 1996. A side-channel analysis attack attacks a cipher using physical information that is generated in a low-power encryption apparatus in which the encryption algorithm has been implemented, unlike a conventional cipher analysis attack that is based on a mathematical theory. The physical information that is used in such side-channel analysis attacks includes the operation time, power consumption level or radiated electromagnetic waves of algorithms. Such side-channel analysis attacks are serious threats against low-power encryption apparatuses in which actual encryption algorithms have been implemented.

In particular, power analysis attacks, which are a type of side-channel analysis attacks, discover a private key by analyzing the characteristics of power consumption measured in a low-power encryption apparatus at the time at which data related to the key is processed while an encryption algorithm is operating. Power analysis attacks may be classified into simple power analysis attacks and differential power analysis attacks.

Meanwhile, with regard to a Lightweight Low-power Encryption Algorithm (LEA) developed for the purpose of software cryptographic operations in a low-power environment, although a block cipher technique was disclosed in the paper entitled "HIGHT A New Block Cipher Suitable for Low-Resource Device" at the Workshop on Cryptographic Hardware and Embedded Systems held in 2006, the block cipher technique disclosed in the paper is susceptible to the above-described side-channel analysis attacks and thus exhibits weakness in security.

SUMMARY OF THE INVENTION

Accordingly, the present invention has been made keeping in mind the above problems occurring in the conventional art, and the present invention is intended to provide an apparatus and method that can support low-power encryption that is robust against side-channel analysis attacks, particularly power analysis attacks.

According to an aspect of the present invention, there is provided a low-power encryption apparatus, including a mask value generation unit configured to generate a mask value M having a bit length identical to that of input round function values; a mask value application unit configured to generate first masking round function values by applying the mask value M to each of the input round function values; a round key application unit configured to generate second masking round function values by applying round key values to the first round function values; a mask operation unit configured to generate third masking round function values by performing a mask addition operation on the second masking round function values; a shift operation unit configured to generate fourth masking round function values by performing a circular shift operation on the third masking round function values; and a shift operation correction unit configured to generate output round function values by performing an operation using the mask value M on the fourth masking round function values.

The input round function values may be an input round function value $X_i[0]$, an input round function value $X_i[1]$, an input round function value $X_i[2]$, and an input round function value $X_i[3]$.

The mask value application unit may generate a first masking round function value $X_{i\_1}[1]$ from the input round function value $X_i[0]$ and the mask value M based on an equation "$X_{i\_1}[0]=X_i[0]\oplus M$", generate a first masking round function value $X_{i\_1}[1]$ from the input round function value $X_i[1]$ and the mask value M based on an equation "$X_{i\_1}[1]=X_i[1]\oplus M$", generate a first masking round function value $X_{i\_1}[2]$ from the input round function value $X_i[2]$ and the mask value M based on an equation "$X_{i\_1}[2]=X_i[2]\oplus M$", and generate a first masking round function value $X_{i\_1}[3]$ from the input round function value $X_i[3]$ and the mask value M based on an equation "$X_{i\_1}[3]=X_i[3]\oplus M$", and $\oplus$ may be an exclusive OR (XOR) operator.

The round key values may be a round key value $RK_i[0]$, a round key value $RK_i[1]$, a round key value $RK_i[2]$, a round key value $RK_i[3]$, a round key value $RK_i[4]$, and a round key value $RK_i[5]$.

The round key application unit may generate a second masking round function value $X_{i\_2}[0]$ from the first masking round $X_{i\_1}[0]$ and the round key value $RK_i[0]$ based on an equation "$X_{i\_2}[0]=X_{i\_1}[0]\oplus RK_i[0]$", generate a second masking round function value $X_{i\_2\_1}[1]$ from the first masking round function value $X_{i\_1}[1]$ and the round key value $RK_i[1]$ based on an equation "$X_{i\_2\_2}[1]=X_{i\_1}[1]\oplus RK_i[1]$", generate a second masking round function value $X_{i\_2\_2}[1]$ from the first masking round function value $X_{i\_1}[1]$ and the round key value $RK_i[2]$ based on an equation "$X_{i\_2\_2}[1]=X_{i\_1}[1]\oplus RK_i[2]$", generate a second masking round function value $X_{i\_2\_2}[2]$ from the first masking round function value $X_{i\_1}[2]$ and the round key value $RK_i[3]$ based on an equation "$X_{i\_2\_1}[2]=X_{i\_1}[2]\oplus RK_i[3]$", generate a second masking round function value $X_{i\_2\_2}[2]$ from the first masking round function value $X_{i\_1}[2]$ and the round key value $RK_i[4]$ based on an equation "$X_{i\_2\_2}[2]=X_{i\_1}[2]\oplus RK_i[4]$", and generate a second masking round function value $X_{i\_2}[3]$ from the first masking round function value $X_{i\_1}[3]$ and the round key value $RK_i[5]$ based on an equation "$X_{i\_2}[3]=X_{i\_1}[3]\oplus RK_i[5]$."

The mask operation unit may generate a third masking round function value $X_{i\_3}[1]$ by performing the mask addition operation, satisfying an equation "$(A \oplus M) \odot (B \oplus M) = (A+B) \oplus M$," on the second masking round function value $X_{i\_2}[0]$ and the second masking round function value $X_{i\_2\_1}[1]$, generate a third masking round function value $X_{i\_3}[2]$ by performing the mask addition operation on the second masking round function value $X_{i\_2\_2}[1]$ and the second masking round function value $X_{i\_2\_1}[2]$, and generate a third masking round function value $X_{i\_3}[3]$ by performing the mask addition operation on the second masking round function value $X_{i\_2\_2}[2]$ and the second masking round function value $X_{i\_2}[3]$, $\odot$ may be a mask addition operator, and each of $A \oplus M$ and $B \oplus M$ may be a second masking round function value to which the mask value M has been applied.

The shift operation unit may generate a fourth masking round function value $X_{i\_4}[1]$ from the third masking round function value $X_{i\_3}[1]$ based on an equation "$X_{i\_4}[1] = ROL_9(X_{i\_3}[1])$", generate a fourth masking round function value $X_{i\_4}[2]$ from the third masking round function value $X_{i\_3}[2]$ based on an equation "$X_{i\_4}[2] = ROR_5(X_{i\_3}[2])$", and generate a fourth masking round function value $X_{i\_4}[3]$ from the third masking round function value $X_{i\_3}[3]$ based on an equation "$X_{i\_4}[3] = ROR_3(X_{i\_3}[3])$", $ROL_a(x)$ may be a function that circularly shifts "x" to a left by "a" bits and then output the result, and $ROR_a(x)$ may be a function that circularly shifts "x" to a right by "a" bits and then output the result.

The shift operation correction unit may generate an output round function value $X_{i+1}[0]$ from the fourth masking round function value $X_{i\_4}[1]$ and the mask value M based on an equation "$X_{i+1}[0] = X_{1\_4}[1] \oplus \{M \oplus ROL_9(M)\}$", generate an output round function value $X_{i+1}[1]$ from the fourth masking round function value $X_{i\_4}[2]$ and the mask value M based on an equation "$X_{i+1}[1] = X_{i\_4}[2] \oplus \{M \oplus ROR_5(M)\}$", generate an output round function value $X_{i+1}[2]$ from the fourth masking round function value $X_{i\_4}[3]$ and the mask value M based on an equation "$X_{i+1}[2] = X_{i\_4}[3] \oplus \{M \oplus ROR_3 M\}$", and generate an output round function value $X_{i+1}[3]$ from the first masking round function value $X_{i\_1}[0]$ based on an equation "$X_{i+1}[3] = X_{i\_1}[0]$."

According to another aspect of the present invention, there is provided a low-power encryption method, including generating a mask value M having a bit length identical to that of input round function values; generating first masking round function values by applying the mask value M to each of the input round function values; generating second masking round function values by applying round key values to the first round function values; generating third masking round function values by performing a mask addition operation on the second masking round function values; generating fourth masking round function values by performing a circular shift operation on the third masking round function values; and generating output round function values by performing an operation using the mask value M on the fourth masking round function values.

The input round function values may be an input round function value $X_i[0]$, an input round function value $X_i[1]$, an input round function value $X_i[2]$, and an input round function value $X_i[3]$.

Generating the first masking round function values may include generating a first masking round function value $X_{i\_1}[0]$ from the input round function value $X_i[0]$ and the mask value M based on an equation "$X_{i\_1}[0] = X_i[0] \oplus M$"; generating a first masking round function value $X_{i\_1}[1]$ from the input round function value $X_i[1]$ and the mask value M based on an equation "$X_{i\_1}[1] = X_i[1] \oplus M$"; generating a first masking round function value $X_{i\_1}[2]$ from the input round function value $X_i[2]$ and the mask value M based on an equation "$X_{i\_1}[2] = X_i[2] \oplus M$"; and generating a first masking round function value $X_{i\_1}[3]$ from the input round function value $X_i[3]$ and the mask value M based on an equation "$X_{i\_1}[3] = X_i[3] \oplus M$"; and $\oplus$ is an XOR operator.

The round key values may be a round key value $RK_i[0]$, a round key value $RK_i[1]$, a round key value $RK_i[2]$, $RK_i[3]$, a round key value $RK_i[4]$, and a round key value $RK_i[5]$.

Generating the second masking round function values may include generating a second masking round function value $X_{i\_2}[0]$ from the first masking round function value $X_{i\_1}[0]$ and the round key value $RK_i[0]$ based on an equation "$X_{i\_2}[0] = X_{i\_1}[0] \oplus RK_i[0]$"; generating a second masking round function value $X_{i\_2\_1}[1]$ from the first masking round function value $X_{i\_1}[1]$ and the round key value $RK_i[1]$ based on an equation "$X_{i\_2\_1}[1] = X_{i\_1}[1] \oplus RK_i[1]$"; generating a second masking round function value $X_{i\_2\_2}[1]$ from the first masking round function value $X_{i\_1}[1]$ and the round key value $RK_i[2]$ based on an equation "$X_{i\_2\_2}[1] = X_{i\_1}[1] \oplus RK_i[2]$"; generating a second masking round function value $X_{i\_2\_1}[2]$ from the first masking round function value $X_{i\_2}[2]$ and the round key value $RK_i[3]$ based on an equation "$X_{i\_2\_1}[2] = X_{i\_1}[2] \oplus RK_i[3]$"; generating a second masking round function value $X_{i\_2\_2}[2]$ from the first masking round function value $X_{i\_1}[2]$ and the round key value $RK_i[4]$ based on an equation "$X_{i\_2\_2}[2] = X_{i\_1}[2] \oplus RK_i[4]$"; and generating a second masking round function value $X_{i\_2}[3]$ from the first masking round function value $X_{i\_1}[3]$ and the round key value $RK_i[5]$ based on an equation "$X_{i\_2}[3] = X_{i\_1}[3] \oplus RK_i[5]$."

Generating the third masking round function values may include generating a third masking round function value $X_{i\_3}[1]$ by performing the mask addition operation, satisfying an equation "$(A \oplus M) \odot (B \oplus M) = (A+B) \oplus M$," on the second masking round function value $X_{i\_2}[0]$ and the second masking round function value $X_{i\_2\_1}[1]$; generating a third masking round function value $X_{i\_3}[2]$ by performing the mask addition operation on the second masking round function value $X_{i\_2\_2}[1]$ and the second masking round function value $X_{i\_2\_1}[2]$; and generating a third masking round function value $X_{i\_3}[3]$ by performing the mask addition operation on the second masking round function value $X_{i\_2\_2}[2]$ and the second masking round function value $X_{i\_2}[3]$; $\odot$ may be a mask addition operator, and each of $A \oplus M$ and $B \oplus M$ may be a second masking round function value to which the mask value M has been applied.

Generating the fourth masking round function values may include generating a fourth masking round function value $X_{i\_4}[1]$ from the third masking round function value $X_{i\_3}[1]$ based on an equation "$X_{i\_4}[1] = ROL_9(X_{i\_3}[1])$"; generating a fourth masking round function value $X_{i\_4}[2]$ from the third masking round function value $X_{i\_3}[2]$ based on an equation "$X_{i\_4}[2] = ROR_5(X_{i\_3}[2])$"; and generating a fourth masking round function value $X_{i\_4}[3]$ from the third masking round function value $X_{i\_3}[3]$ based on an equation "$X_{i\_4}[3] = ROR_3(X_{i\_3}[3])$"; $ROL_3(x)$ may be a function that circularly shifts "x" to a left by "a" bits and then outputs a result, and $ROR_a(x)$ may be a function that circularly shifts "x" to a right by "a" bits and then outputs a result.

Generating the output round function values may include generating an output round function value $X_{i+1}[0]$ from the fourth masking round function value $X_{i\_4}[1]$ and the mask value M based on an equation "$X_{i+1}[0] = X_{i\_4}[1] \oplus \{M \oplus ROL_9(M)\}$"; generating an output round function value $X_{i+1}[1]$ from the fourth masking round function value $X_{i\_4}[2]$ and the mask value M based on an equation "$X_{i+1}[1] = X_{i\_4}[2] \oplus \{M \oplus ROR_5(M)\}$"; generating an output round function value $X_{i+1}[2]$ from the fourth masking round function value $X_{i\_4}[3]$ and the mask value M based on an equation "$X_{i+1}[2]=X_{i\_4}[3]\oplus\{M\oplus ROR_3M\}$"; and generating an output round function value $X_{i+1}[3]$ from the first masking round function value $X_{i\_1}[0]$ based on an equation "$X_{i+1}[3]=X_{i\_1}[0]$."

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

The configuration and operation of a low-power encryption apparatus according to the present invention will be described below with reference to FIGS. 1 and 2.

Figure 1:
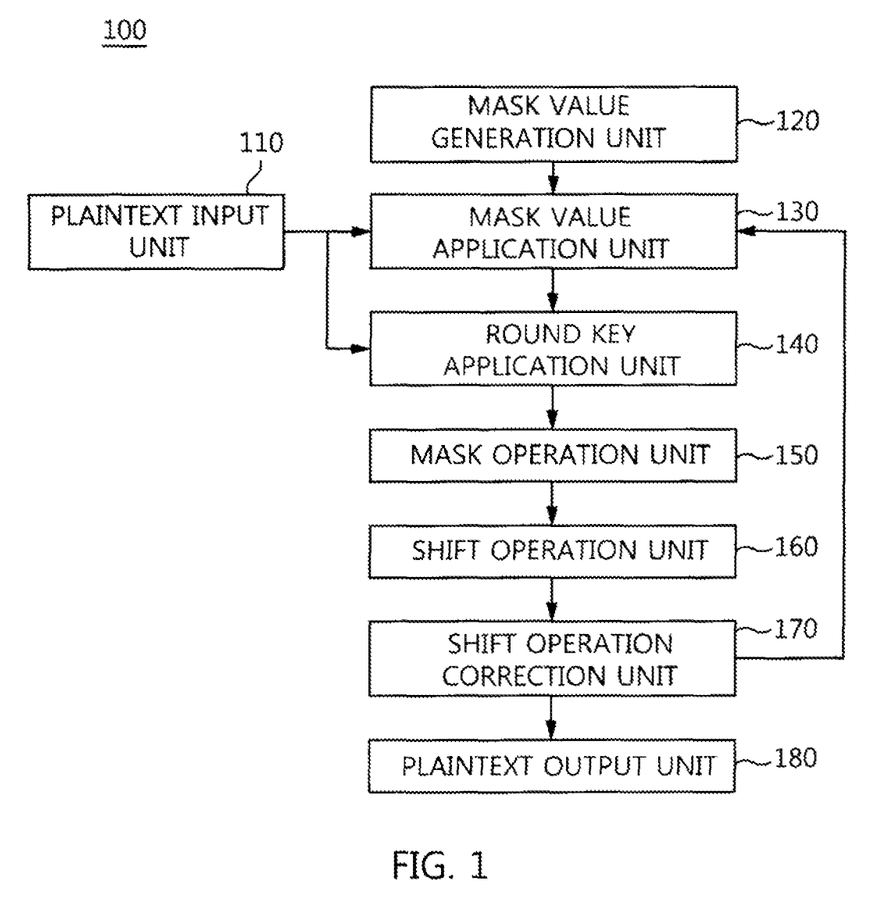
FIG. 1 is a block diagram illustrating the configuration of a low-power encryption apparatus according to an embodiment of the present invention.

FIG. 1 is a block diagram illustrating the configuration of a low-power encryption apparatus 100 according to an embodiment of the present invention.

Referring to FIG. 1, the low-power encryption apparatus 100 according to the present invention includes a plaintext input unit 110, a mask value generation unit 120, a mask value application unit 130, a round key application unit 140, a mask operation unit 150, a shift operation unit 160, a shift operation correction unit 170, and a plaintext output unit 180.

The plaintext input unit 110 receives an encryption target called plaintext P, such as specific text or voice, from a user. In this case, the plaintext P that is input to the plaintext input unit 110 has a length of 128 bits, and includes sub-plaintexts each having a length of 32 bits. That is, plaintext P is a concatenation of a plurality of sub-plaintexts each having a length of 32 bits, and the plaintext P having a length of 128 bits may be expressed by the following Equation 1:

$$P=P[0]\|P[1]\|P[2]\|P[3] \tag{1}$$

where P[0] to P[3] are sub-plaintexts that constitute the plaintext P and each have a length of 32 bits.

Meanwhile, in a low power encryption process according to the present invention, when a round key having, a length of 128 bits, 192 bits or 256 bits is input, a round function for encryption can be repeatedly applied 24, 28, and 32 times. In this case, the sub-plaintexts P[0] to P[3] become initial input round function values $X_1[0]$ to $X_1[3]$ that are input as the input values of a first round function to repeatedly apply a round function.

Furthermore, the plaintext input unit 110 receives a master key from the user, generates a round key (RK) from the master key, and generates round key values, required to output output round function values $X_{i+1}[0]$ to $X_{i+1}[3]$ by encrypting input round function values $X_i[0]$ to $X_i[3]$ input to respective round functions, from the generated round key. In this case, the plaintext input unit 110 may receive a master key from the user, generate a round key $RK_1$, used to encrypt input round function values $X_i[0]$ to $X_i[3]$ in an i-th round and adapted to have a length of 192 bits, from the master key, and generate six round key values $RK_i[0]$ to $RK_i[5]$ each having a length of 32 bits based on the following Equation 2:

$$RK_i=RK_i[0]\|RK_i=RK_i[1]\|RK_i=RK_i[2]\|RK_i=RK_i[3]$$
$$\|RK_i=RK_i[4]\|RK_i=RK_i[5] \tag{2}$$

The plaintext input unit 110 transmits the initial input round function values $X_i[0]$ to $X_i[3]$ generated from the plaintext P to the mask value application unit 130, and transmits the round key values $RK_i[0]$ to $RK_i[5]$ generated from the master key to the round key application unit 130.

The mask value generation unit 120 generates a mask value having the same bit length as the input round function values. In this case, the mask value generation unit 120 may generate a mask value M that has a length of 32 bits, which is the bit length of each of the input round function values $X_i[0]$ to $X_i[3]$. The mask value generation unit 120 transmits the generated mask value M to the mask value application unit 130. The mask value M is a value that has a length of 32 bits that are randomly generated. Although the same mask value M may be used for masking for the input round function values $X_i[0]$ to $X_i[0]$ in all rounds, the mask value is changed from the mask value M to another mask value M' in a specific round and the mask value M' is used from that specific round onwards. In this case, the mask value generation unit 120 may generate the resulting mask value M' and transmit the resulting mask value M' to the mask value application unit 130.

The mask value application unit 130 generates first masking round function values $X_{1\_1}[0]$ to $X_{1\_1}[3]$ in a first round by applying the mask value received from the mask value generation unit 120 to each of the initial input round function values $X_1[0]$ to $X_1[3]$ received from the plaintext input unit 110. Furthermore, the mask value application unit 130 generates first masking round function values by setting output round function values in a previous round generated by the shift operation correction unit 170 as input round function values in a corresponding round and applying the mask value to the input round function values. That is, the mask value application unit 130 may generate first masking round function values $X_{1\_1}[0]$ to $X_{1\_1}[3]$ by applying a mask value M to each of input round function values $X_i[0]$ to $X_i[3]$ (input round function values in an i-th round, $i\geq 1$). In this case, the mask value application unit 130 generates the first masking round function values $X_{i\_1}[3]$ by performing an exclusive OR (XOR) operation on each of the input round function values $X_i[0]$ to $X_i[3]$ and the mask value M based on the following Equation 3:

$$X_{i\_1}[j]=X_i[j]\oplus M,\ i\geq 1,\ 0\leq j\leq 3 \tag{3}$$

where $\oplus$ is an XOR operator.

More specifically, the mask value application unit 130 generates a first masking round function value $X_{i\_1}[0]$ from the input round function value $X_i[0]$ and the mask value M based on the equation "$X_{i\_1}[0]=X_i[0]\oplus M$," and generates a first masking round function value $X_{i\_1}[1]$ from the input round function value $X_i[1]$ and the mask value M based on the equation "$X_{i\_1}[1]=X_i[1]\oplus M$." Furthermore, the mask value application unit 130 generates a first masking round function value $X_{i\_1}[2]$ from the input round function value $X_i[2]$ and the mask value M based on the equation "$X_{i\_1}[2]=X_i[2]\oplus M$," and generates a first masking round function value $X_{i\_1}[3]$ from the input round function value $X_i[3]$ and the mask value M based on the equation "$X_{i\_1}[3]=X_i[3]\oplus M$."

The mask value application unit 130 transmits the generated first masking round function values $X_i[0]$ to $X_i[3]$ to the round key application unit 140.

The round key application unit 140 generates second masking round function values by applying the round key values $RK_i[0]$ to $RK_i[5]$ received from the plaintext input unit 110 to the respective input round function values $X_{i\_1}[3]$ received from the mask value application unit 130. More specifically, the round key application unit 140 generates a second masking round function value $X_{i\_2}[0]$ from the first masking round function value $X_{i\_1}[0]$ and the round key value $RK_i[0]$ based on the equation "$X_{i\_2}[0]=X_{i\_1}[0]\oplus RK_i[0]$," and generates a second masking round function value $X_{i\_2\_1}[1]$ from the first masking round function value $X_{i\_1}[1]$ and the round key value $RK_i[1]$ based on the equation "$X_{i\_2\_1}[1]=X_{i\_1}[1]\oplus RK_i[1]$." Furthermore, the round key application unit 140 generates a second masking round function value $X_{i\_2\_2}[1]$ from the first masking round function value $X_{i\_1}[1]$ and the round key value $RK_i[2]$ based on the equation "$X_{i\_2\_2}[1]=X_{i\_1}[1]\oplus RK_i[2]$," and generates a second masking round function value $X_{i\_2\_1}[2]$ from the first masking round function value $X_{i\_1}[2]$ and the round key value $RK_i[3]$ based on the equation "$X_{i\_2\_1}[2]=X_{i\_1}[2]\oplus RK_i[3]$." Furthermore, the round key application unit 140 generates a second masking round function value $X_{i\_2\_2}[2]$ from the first masking round function value $X_{i\_1}[2]$ and the round key value $RK_i[4]$ based on the equation "$X_{i\_2\_2}[2]=X_{i\_1}[2]\oplus RK_i[4]$," and generates a second masking round function value $X_{i\_2}[3]$ from the first masking round function value $X_{i\_1}[3]$ and the round key value $RK_i[5]$ based on the equation "$X_{i\_2}[3]=X_{i\_1}[3]\oplus RK_i[5]$."

The round key application unit 140 transmits the generated second masking round function values $X_{i\_2}[0]$, $X_{i\_2\_1}[1]$, $X_{i\_2\_2}[1]$, $X_{i\_2\_1}[2]$, $X_{i\_2\_2}[2]$ and $X_{i\_2}[3]$ to the mask operation unit 150.

The mask operation unit 150 generates third masking round function values by performing a mask addition operation on the second masking round function values $X_{i\_2}[0]$, $X_{i\_2\_1}[1]$, $X_{i\_2\_2}[1]$, $X_{i\_2\_1}[2]$, $X_{i\_2\_2}[2]$, $X_{i\_2}[3]$ received from the round key application unit 140. Here, the mask addition operation is an operation that satisfies the following Equation 4 and that is defined in this specification:

$$(A\oplus M)\odot(B\oplus M)=(A+B)\oplus M \qquad (4)$$

where $\odot$ is a mask addition operator, + is an OR operator, and each of $A\oplus M$ and $B\oplus M$ is the second masking round function value to which the mask value M has been applied.

The mask addition operation that is defined in this specification will now be described using an example. When the input value $A\oplus M$ is "$X_i[0]\oplus M\oplus RK_i[0]$" (in this case, "A" corresponds to $X_i[0]\oplus RK_i[0]$ and the input value $B\oplus M$ is "$X_i[1]\oplus M\oplus RK_i[1]$" (in this case, "B" corresponds to $X_i[1]\oplus RK_i[1]$), the mask addition operation outputs "$\{(X_i[0]\oplus RK_i[0])+(X_i[1]\oplus RK_i[1])\}\oplus M$."

The mask operation unit 150 generates a third masking round function value $X_{i\_3}[2]$ by performing a mask addition operation on the second masking round function value $X_{i\_2}[0]$ and the second masking round function value $X_{i\_2\_1}[1]$. In this case, the third masking round function value $X_{i\_3}[1]$ has a value corresponding to "$(X_i[0]\oplus M\oplus RK_i[0])\odot(X_i[1]\oplus M\oplus RK_i[1])$" (that is, "$\{(X_i[0]\oplus RK_i[0])+(X_i[1]\oplus RK_i[1])\}\oplus M$." Furthermore, the mask operation unit 150 generates a third masking round function value $X_{i\_3}[2]$ by performing a mask addition operation on the second masking round function value $X_{i\_2\_2}[1]$ and the second masking round function value $X_{i\_2\_2}[2]$. In this case, the third masking round function value $X_{i\_3}[2]$ has a value corresponding to "$(X_i[1]\oplus M\oplus RK_i[2])\odot(X_i[2]\oplus M\oplus RK_i[3])$" (that is, "$\{(X_i[1]\oplus RK_i[2])+(X_i[2]\oplus RK_i[3])\}\oplus M$"). Furthermore, the mask operation unit 150 generates a third masking round function value $X_{i\_3}[3]$ by performing a mask addition operation on the second masking round function value $X_{i\_2\_2}[2]$ and the second masking round function value $X_{i\_2}[3]$. In this case, the third masking round function value $X_{i\_3}[3]$ has a value corresponding to "$(X_i[2]\oplus M\oplus RK_i[4])\odot(X_i[3]\oplus M\oplus RK_i[5])$" (that is, "$\{(X_i[2]\oplus RK_i[4])+(X_i[3]\oplus RK_i[5])\}\oplus M$").

The mask operation unit 150 transmits the generated third masking round function values $X_{i\_3}[1]$, $X_{i\_3}[2]$ and $X_{i\_3}[3]$ to the shift operation unit 160.

The shift operation unit 160 generates fourth masking round function values by performing a circular shift operation on the third masking round function values $X_{i\_3}[1]$, $X_{i\_3}[2]$ and $X_{i\_3}[3]$ received from the mask operation unit 150. More specifically, the shift operation unit 160 generates a fourth masking round function value $X_{i\_4}[1]$ from the third masking round function value $X_{i\_3}[1]$ based on the equation "$X_{i\_4}[1]=ROL_9(X_{i\_3}[1])$." Here, $ROL_a(x)$ is a function that circularly shifts "x" to the left by "a" bits and outputs the result. In this case, the fourth masking round function value $X_{i\_4}[1]$ has a value corresponding to "$ROL_9\{(X_i[0]\oplus M\oplus RK_i[0])\odot(X_i[1]\oplus M\oplus RK_i[1])\}$" (that is, "$ROL_9[\{(X_i[0]\oplus RK_i[0])+(X_i[1]\oplus RK_i[1])\}\oplus M]$"). Furthermore, the shift operation unit 160 generates a fourth masking round function value $X_{i\_4}[2]$ from the third masking round function value $X_{i\_3}[1]$ based on the equation "$X_{i\_4}[2]=ROR_5(X_{i\_3}[2])$." Here, $ROR_a(x)$ is a function that circularly shifts "x" to the right and outputs the result. In this case, the fourth masking round function value $X_{i\_4}[2]$ has a value corresponding to "$ROR_5\{(X_i[1]\oplus M\oplus RK_i[2])\odot(X_i[2]\oplus M\oplus RK_i[3])\}$" (that is, "$ROR_5[\{(X_i[1]\oplus RK_i[2])+(X_i[2]\oplus RK_i[3])\}\oplus M]$". Furthermore, the shift operation unit 160 generates a fourth masking round function value $X_{i\_4}[3]$ from the third masking round function value $X_{i\_3}[3]$ based on the equation "$X_{i\_4}[3]=ROR_3(X_{i\_3}[3])$." In this case, the fourth masking round function value $X_{i\_4}[3]$ has a value corresponding to $X_{i\_4}[2]$ has a value corresponding to "$ROR_3\{(X_i[2]\oplus M\oplus RK_i[4])\odot(X_i[3]\oplus M\oplus RK_i[5])\}$" (that is, "$ROR_3[\{(X_i[2]\oplus RK_i[4])+(X_i[3]\oplus RK_i[5])\}\oplus M]$".

The shift operation unit 160 transmits the generated fourth masking round function values $X_{i\_4}[1]$, $X_{i\_4}[2]$ and $X_{i\_4}[3]$ to the shift operation correction unit 170.

The shift operation correction unit 170 generates output round function values by performing an operation using the mask value M on the fourth masking round function values $X_{i\_4}[1]$, $X_{i\_4}[2]$ and $X_{i\_4}[3]$ received from the shift operation unit 160. More specifically, the shift operation correction unit 170 generates an output round function value $X_{i+1}[0]$ from the fourth masking round function value $X_{i\_4}[1]$ and the mask value M based on the equation "$X_{i+1}[0]=X_{i\_4}[1]\oplus\{M\oplus ROL_9(M)\}$." In this case, output round function value $X_{i+1}[0]$ has a value corresponding to "$ROL_9\{(X_i[0]\oplus M\oplus RK_i[0])\odot(X_i[1]\oplus M\oplus RK_i[1])\}\oplus\{M\oplus ROL_9(M)\}$" (that is, "$ROL_9[\{(X_i[0]\oplus RK_i[0])+(X_i[1]\oplus RK_i[1])\}\oplus M]\oplus\{M\oplus ROL_9(M)\}$". Furthermore, the shift operation correction unit 170 generates an output round function value $X_{i+1}[1]$ from the fourth masking round function value $X_{i\_4}[2]$ and the mask value M based on the equation "$X_{i+1}[1]=X_{i\_4}[2]\oplus\{M\oplus ROR_5(M)\}$." In this case, the output round function value $X_{i+1}[1]$ has a value corresponding to "$ROR_5\{(X_i[1]\oplus M\oplus RK_i[2])\odot(X_i[2]\oplus M\oplus RK_i[3])\}\oplus\{M\oplus ROR_5(M)\}$" (that is, "$ROR_5[\{(X_i[1]\oplus RK_i[2])+(X_i[2]\oplus RK_i[3])\}\oplus M]\oplus\{M\oplus ROR_5(M)\}$"). Furthermore, the shift operation correction unit 170 generates an output round function value $X_{i+1}[2]$ from the fourth masking round function value $X_{i\_4}[3]$ and the mask value M based on the equation "$X_{i+1}[2]=X_{i\_4}[3]\oplus\{M\oplus ROR_3(M)\}$." In this case, the output round function value $X_{i+1}[2]$ has a value corresponding to "$ROR_3\{(X_i[2]\oplus M\oplus RK_i[4])\odot(X_i[3]\oplus M\oplus RK_i[5])\}\oplus\{M\oplus ROR_3(M)\}$" (that is, "$ROR_3[\{(X_i[2]\oplus RK_i[4])+(X_i[3]\oplus RK_i[5])\}\oplus M]\oplus\{M\oplus ROR_3(M)\}$"). Meanwhile, the shift operation correction unit 170 generates an output round function value $X_{i+1}[3]$ from the first masking round function value $X_{i+1}[0]$ based on the equation "$X_{i+1}[3]=X_{i\_1}[0]$." In this case, the output round function value $X_{i+1}[3]$ has a value corresponding to "$X_i[0]\oplus M$."

If an i-th round corresponds to the last round of the encryption process, the shift operation correction unit 170 transmits the output round function values $X_{i\_4}[0]$, $X_{i\_4}[1]$, $X_{i\_4}[2]$ and $X_{i\_4}[3]$ to the plaintext output unit 180. In contrast, if the i-th round does not correspond to the last round of the encryption process, the shift operation correction unit 170 transmits the output round function values $X_{i+1}[0]$, $X_{i+1}[1]$, $X_{i+1}[2]$ and $X_{i+1}[3]$ to the mask value application unit 130, so that the encryption process in a subsequent round (an (i+1)-th round) is performed.

When the plaintext output unit 180 receives the output round function values $X_{i+1}[0]$, $X_{i+1}[1]$, $X_{i+1}[2]$ and $X_{i+1}[3]$ from the shift operation correction unit 170, the plaintext output unit 180 outputs plaintext finally encrypted from the output round function values $X_{i+1}[0]$, $X_{i+1}[1]$, $X_{i+1}[2]$ and $X_{i+1}[3]$. In this case, the plaintext output unit 180 outputs encrypted plaintext P' having a length of 128 bits by concatenating the output round function values $X_{i+1}[0]$, $X_{i+1}[1]$, $X_{i+1}[2]$ and $X_{i+1}[3]$ with each other as shown in the following Equation 5:

$$P'=X_{i+1}[0]\|X_{i+1}[1]\|X_{i+2}[2]\|X_{i+1}[3] \quad (5)$$

In this case, each of the output round function values $X_{i+1}[0]$, $X_{i+1}[1]$, $X_{i+1}[2]$ and $X_{i+1}[3]$ has a length of 32 bits, and thus the encrypted plaintext P' is output as plaintext having a length of 128 bits.

Figure 2:
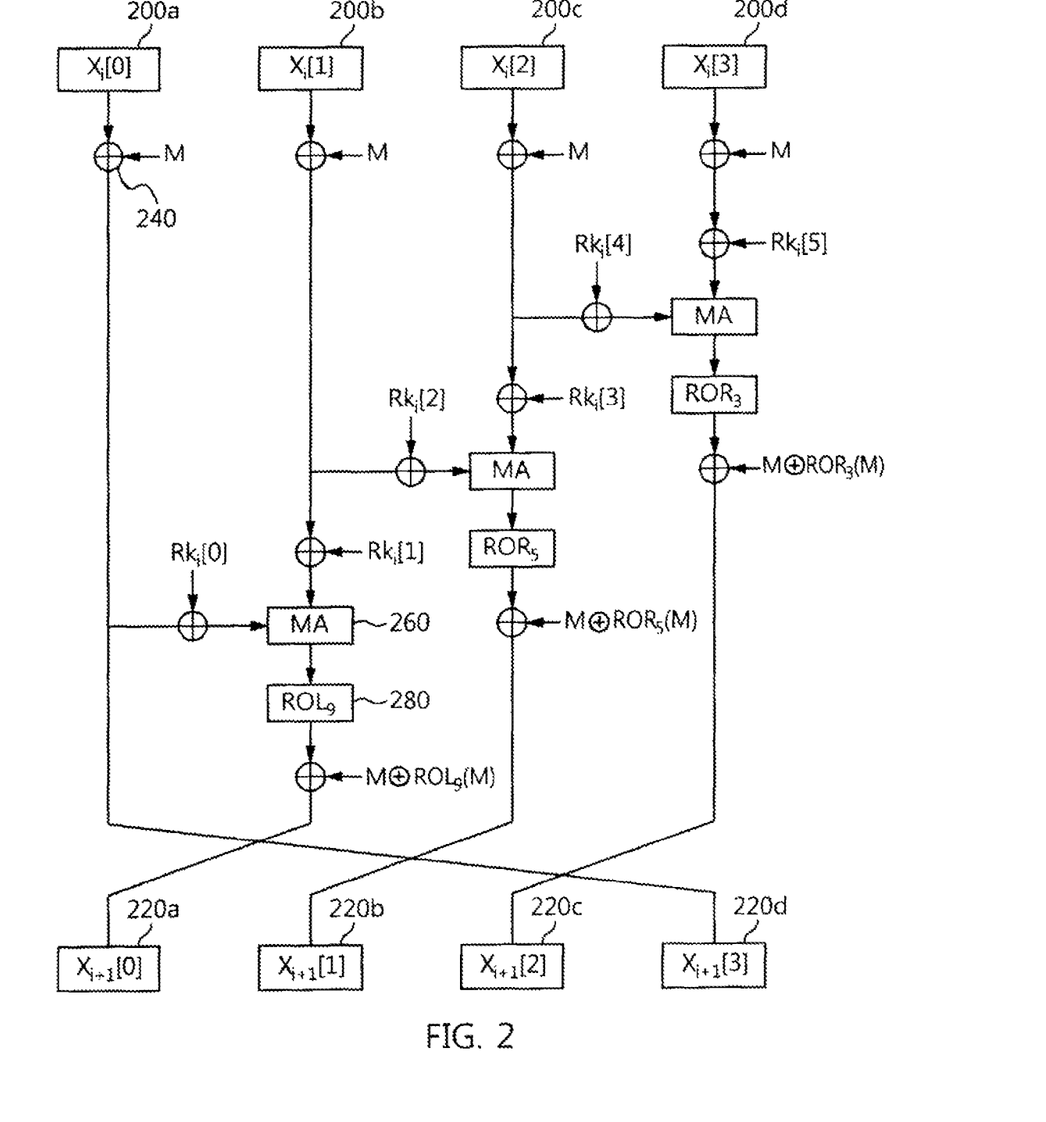
FIG. 2 is a diagram illustrating an encryption algorithm that is performed by the low-power encryption apparatus according to the present invention.

FIG. 2 is a diagram illustrating an encryption algorithm in an i-th round that is performed by the mask value application unit 130, round key application unit 140, mask operation unit 150, shift operation unit 160, and shift operation correction unit 170 of the low-power encryption apparatus 100 according to this embodiment of the present invention.

Referring to FIG. 2, in the i-th round, an XOR operation 240, a mask addition operation 260, and a circular shift operation 280 are performed on each input value, that is, each of an input round function value $X_i[0]$ 200a, an input round function value $X_i[1]$ 200b, an input round function value $X_i[2]$ 200c and an input round function value $X_i[3]$ 200d, and an output round function value $X_{i+1}[0]$ 220a, an output round function value $X_{i+1}[1]$ 220b, an output round function value $X_{i+1}[2]$ 220c and an output round function value $X_{i+1}[3]$ 220d are output as final output values.

In this case, the output round function value $X_{i+1}[0]$ 220a, the output round function value $X_{i+1}[1]$ 220b, the output round function value $X_{i+1}[2]$ 220c and the output round function value $X_{i+1}[3]$ 220d have values based on the following Equations 6 to 9:

$$X_{i+1}[0]=ROL_9\{(X_i[0]\oplus M\oplus RK_i[0])\odot(X_i[1]\oplus M\oplus RK_i[1])\}\oplus\{M\oplus ROL_9(M)\}=ROL_9[\{(X_i[0]\oplus RK_i[0])+(X_i[1]\oplus RK_i[1])\}\oplus M]\oplus\{M\oplus ROL_9(M)\} \quad (6)$$

$$X_{i+1}[1]=ROR_5\{(X_i[1]\oplus M\oplus RK_i[2])\odot(X_i[2]\oplus M\oplus RK_i[3])\}\oplus\{M\oplus ROR_5(M)\}=ROR_5[\{(X_i[1]\oplus RK_i[2])+(X_i[2]\oplus RK_i[3])\}\oplus M]\oplus\{M\oplus ROR_5(M)\} \quad (7)$$

$$X_{i+1}[2]=ROR_3\{(X_i[2]\oplus M\oplus RK_i[4])\odot(X_i[3]\oplus M\oplus RK_i[5])\}\oplus\{M\oplus ROR_3(M)\}=ROR_3[\{(X_i[2]\oplus RK_i[4])+(X_i[3]\oplus RK_i[5])\}\oplus M]\oplus\{M\oplus ROR_5(M)\} \quad (8)$$

$$X_{i+1}[3]=X_i[0]\oplus M \quad (9)$$

A low-power encryption method according to the present invention will be described below. It is noted that redundant descriptions that are the same as those of the operation of the low-power encryption apparatus according to the former embodiment of the present invention, which have been given in conjunction with FIGS. 1 and 2, will be omitted in the following description.

Figure 3:
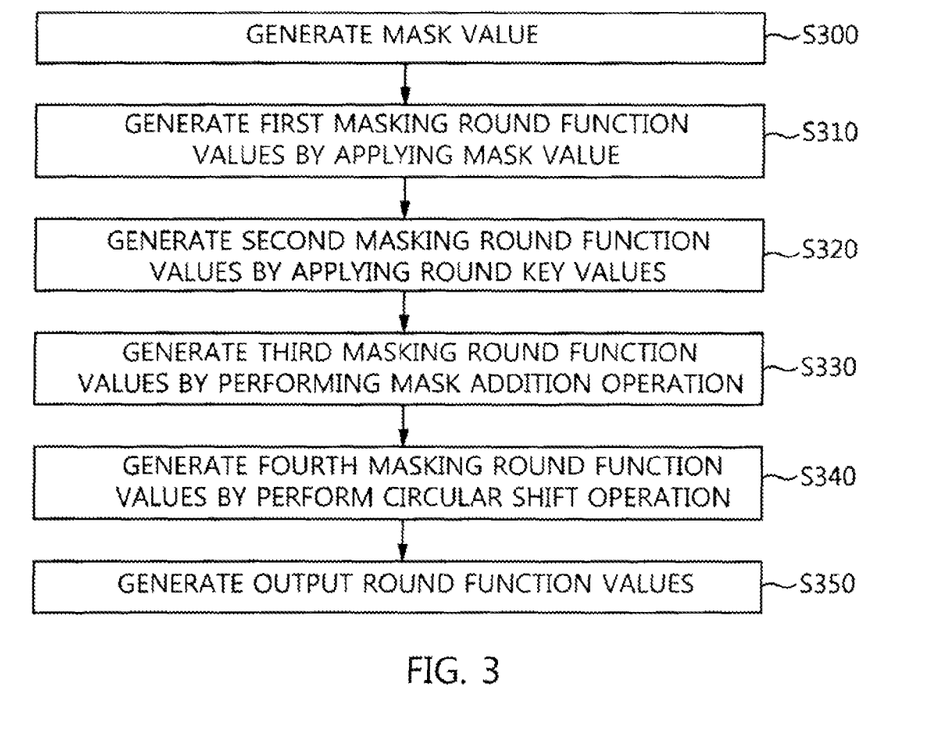
FIG. 3 is a flowchart illustrating a low-power encryption method according to an embodiment of the present invention.

FIG. 3 is a flowchart illustrating a low-power encryption method according to an embodiment of the present invention.

Referring to FIG. 3, in the low-power encryption method according to this embodiment of the present invention, first, the plaintext input unit 110 generates input round function values $X_i[0]$, $X_i[1]$, $X_i[2]$ and $X_i[3]$, and the mask value generation unit 120 generates a mask value M having the same bit length as the input round function values $X_i[0]$, $X_i[1]$, $X_i[2]$ and $X_i[3]$ generated by the plaintext input unit 110 at step S300. In this case, if each of the input round function values $X_i[0]$, $X_i[1]$, $X_i[2]$ and $X_i[3]$ has a length of 32 bits, the mask value M may also have a length of 32 bits.

Thereafter, the mask value application unit 130 generates first masking round function values $X_{i\_1}[0]$, $X_{i\_1}[1]$, $X_{i\_1}[2]$ and $X_{i\_1}[3]$ by applying the mask value M to each of the input round function values $X_i[0]$, $X_i[1]$, $X_i[2]$ and $X_i[0]$ at step S310. In this case, the mask value application unit 130 generates a first masking round function value $X_{i\_1}[0]$ from the input round function value $X_i[0]$ and the mask value M based on the equation "$X_{i\_1}[0]=X_i[0]\oplus M$," and generates a first masking round function value $X_{i\_1}[1]$ from the input round function value $X_i[1]$ and the mask value M based on the equation "$X_{i\_1}[1]=X_i[1]\oplus M$." Furthermore, the mask value application unit 130 generates a first masking round function value $X_{i\_1}[2]$ from the input round function value $X_i[2]$ and the mask value M based on the equation "$X_{i\_1}[2]=X_i[2]\oplus M$," and generates a first masking round function value $X_{i\_1}[3]$ from the input round function value $X_i[3]$ and the mask value M based on the equation "$X_{i\_1}[3]=X_i[3]\oplus M$."

Furthermore, the round key application unit 140 generates second masking round function values $X_{i\_2}[0]$, $X_{i\_2\_1}[1]$, $X_{i\_2\_2}[1]$, $X_{i\_2\_1}[2]$, $X_{i\_2\_21}[2]$ and $X_{i\_2}[3]$ by applying round key values $RK_i[0]$, $RK_i[1]$, $RK_i[2]$, $RK_i[3]$, $RK_i[4]$ and $RK_i[5]$ to the first round function values $X_{i\_1}[0]$, $X_{i\_1}[1]$, $X_{i\_1}[2]$ and $X_{i\_1}[3]$ at step S320. In this case, the round key application unit 140 generates a second masking round function value $X_{i\_2}[0]$ from the first masking round function value $X_{i\_1}[0]$ and the round key value $RK_i[0]$ based on the equation "$X_{i\_2}[0]=X_{i\_1}[0]\oplus RK_i[0]$," and generates a second masking round function value $X_{i\_2\_1}[1]$ from the first masking round function value $X_{i\_1}[1]$ and the round key value $RK_i[1]$ based on the equation "$X_{i\_2\_1}[1]=X_{i\_1}[1]\oplus RK_i[1]$." Furthermore, the round key application unit 140 generates a second masking round function value $X_{i\_2\_2}[1]$ from the first masking round function value $X_{i\_1}[1]$ and the round key value $RK_i[2]$ based on the equation "$X_{i\_2\_2}[1]=X_{i\_1}[1] \oplus RK_i[2]$," and generates a second masking round function value $X_{i\_2\_1}[2]$ from the first masking round function value $X_{i\_1}[2]$ and the round key value $RK_i[3]$ based on the equation "$X_{i\_2\_1}[2]=X_{i\_1}[2] \oplus RK_i[3]$." Furthermore, the round key application unit 140 generates a second masking round function value $X_{i\_2\_2}[2]$ from the first masking round function value $X_{i\_1}[2]$ and the round key value $RK_i[4]$ based on the equation "$X_{i\_2\_2}[2]=X_{i\_1}[2] \oplus RK_i[4]$," and generates a second masking round function value $X_{i\_2}[3]$ from the first masking round function value $X_{i\_1}[3]$ and the round key value $RK_i[5]$ based on the equation "$X_{i\_2}[3]=X_{i\_1}[3] \oplus RK_i[5]$."

Thereafter, the mask operation unit 150 generates third masking round function values $X_{i\_3}[1]$, $X_{i\_3}[2]$ and $X_{i\_3}[3]$ by performing a mask addition operation, satisfying the equation "$(A \oplus M) \odot (B \oplus M)=(A+B) \oplus M$," on the second masking round function values $X_{i\_2}[0]$, $X_{i\_2\_1}[1]$, $X_{i\_2\_2}[1]$, $X_{i\_2\_1}[2]$, $X_{i\_2\_2}[2]$ and $X_{i\_2}[3]$ at step S330. In this case, the mask operation unit 150 generates a third masking round function value $X_{i\_3}[1]$ by performing a mask addition operation on the second masking round function value $X_{i\_2}[0]$ and the second masking round function value $X_{i\_2\_1}[1]$. Furthermore, the mask operation unit 150 generates a third masking round function value $X_{i\_3}[2]$ by performing a mask addition operation on the second masking round function value $X_{i\_2\_2}[1]$ and the second masking round function value $X_{i\_2\_1}[2]$. Furthermore, the mask operation unit 150 generates a third masking round function value $X_{i\_3}[3]$ by performing a mask addition operation on the second masking round function value $X_{i\_2\_2}[2]$ and the second masking round function value $X_{i\_2}[3]$.

Furthermore, the shift operation unit 160 generates fourth masking round function values $X_{i\_4}[1]$, $X_{i\_4}[2]$ and $X_{i\_4}[3]$ by performing a circular shift operation on the third masking round function values $X_{i\_3}[1]$, $X_{i\_3}[2]$ and $X_{i\_3}[3]$ at step S340. In this case, the shift operation unit 160 generates a fourth masking round function value $X_{i\_4}[1]$ from the third masking round function value $X_{i\_3}[1]$ based on the equation "$X_{i\_4}[1]=ROL_9(X_{i\_1}[1])$." Furthermore, the shift operation unit 160 generates a fourth masking round function value $X_{i\_4}[2]$ from the third masking round function value $X_{i\_3}[2]$ based on the equation "$X_{i\_4}[2]=ROR_5(X_{i\_3}[2])$." Furthermore, the shift operation unit 160 generates a fourth masking round function value $X_{i\_4}[3]$ from the third masking round function value $X_{i\_3}[3]$ based on the equation "$X_{i\_4}[3]=ROR_3(X_{i\_3}[3])$."

Thereafter, the shift operation correction unit 170 generates output round function values $X_{i+1}[0]$, $X_{i+1}[1]$, $X_{i+1}[2]$, and $X_{i+1}[3]$ by performing an operation using the mask value M on the fourth masking round function values $X_{i\_4}[1]$, $X_{i\_4}[2]$ and $X_{i\_4}[3]$ at step S350. In this case, the shift operation correction unit 170 generates an output round function value $X_{i+1}[0]$ from the fourth masking round function value $X_{i\_4}[1]$ and the mask value M based on the equation "$X_{i+1}[0]=X_{i\_4}[1] \oplus \{M \oplus ROL_9(M)\}$." Furthermore, the shift operation correction unit 170 generates an output round function value $X_{i+1}[1]$ from the fourth masking round function value $X_{i\_4}[2]$ and the mask value M based on the equation "$X_{i+1}[1]=X_{i\_4}[2] \oplus \{M \oplus ROR_5(M)\}$." Furthermore, the shift operation correction unit 170 generates an output round function value $X_{i+1}[2]$ from the fourth masking round function value $X_{i\_4}[3]$ and the mask value M based on the equation "$X_{i+1}[2]=X_{i\_4}[3] \oplus \{M \oplus ROR_3(M)\}$." Meanwhile, the shift operation correction unit 170 generates an output round function value $X_{i+1}[3]$ from the first masking round function value $X_{i\_1}[0]$ generated by the mask value application unit 130 based on the equation "$X_{i+1}[3]=X_{i\_1}[0]$." If the i-th round does not correspond to the last round of the encryption process, the shift operation correction unit 170 transmits the output round function values $X_{i+1}[0]$, $X_{i+1}[1]$, $X_{i+1}[2]$, and $X_{i+1}[3]$ to the mask value application unit 130 at step S350, so that steps S310 to S350 can be performed in a subsequent round (an (i+1)-th round).

Figure 4:
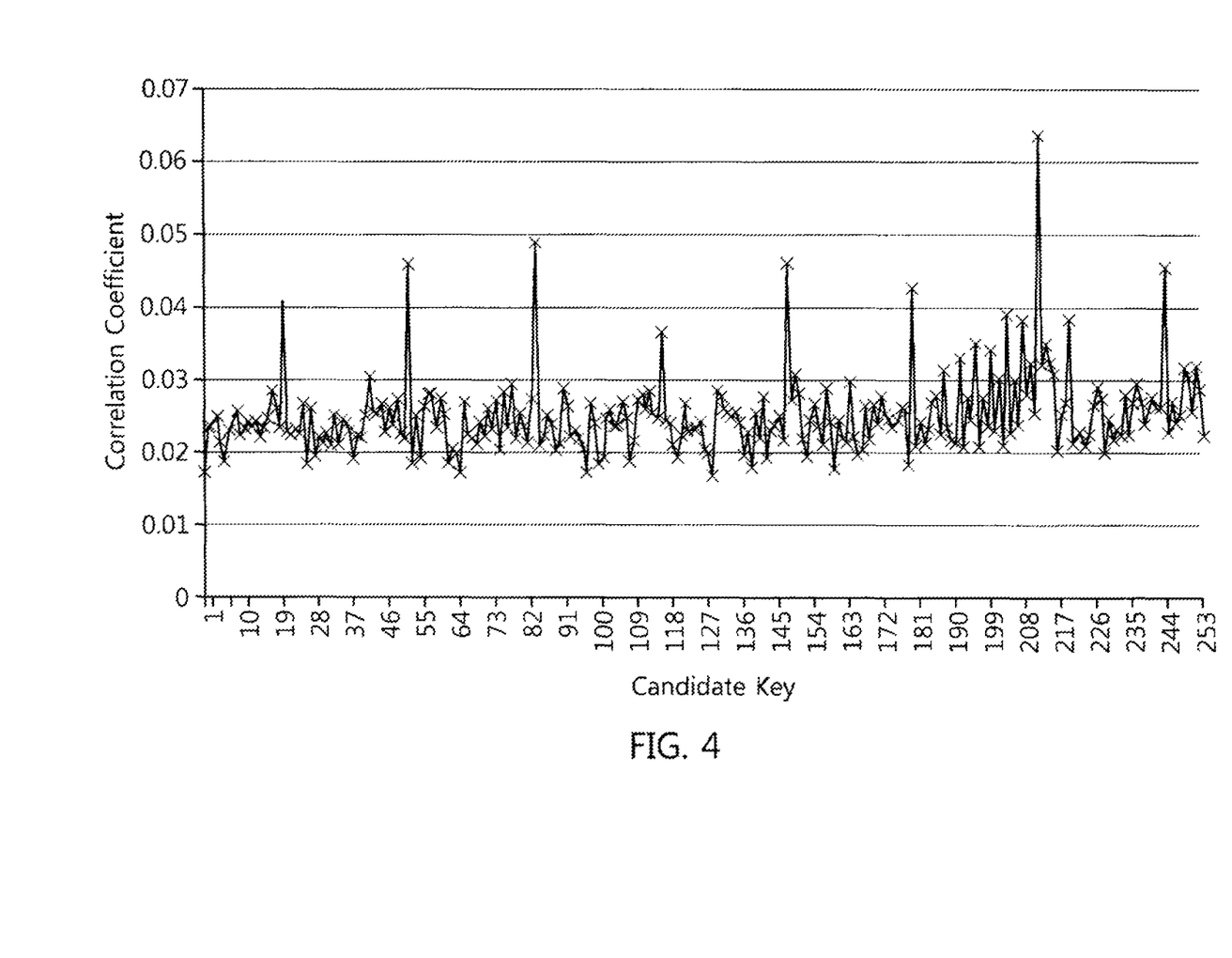
FIG. 4 is a graph illustrating correlation coefficients fir the values of candidate keys when a differential power analysis attack was made on a conventional low power encryption algorithm.
Figure 5:
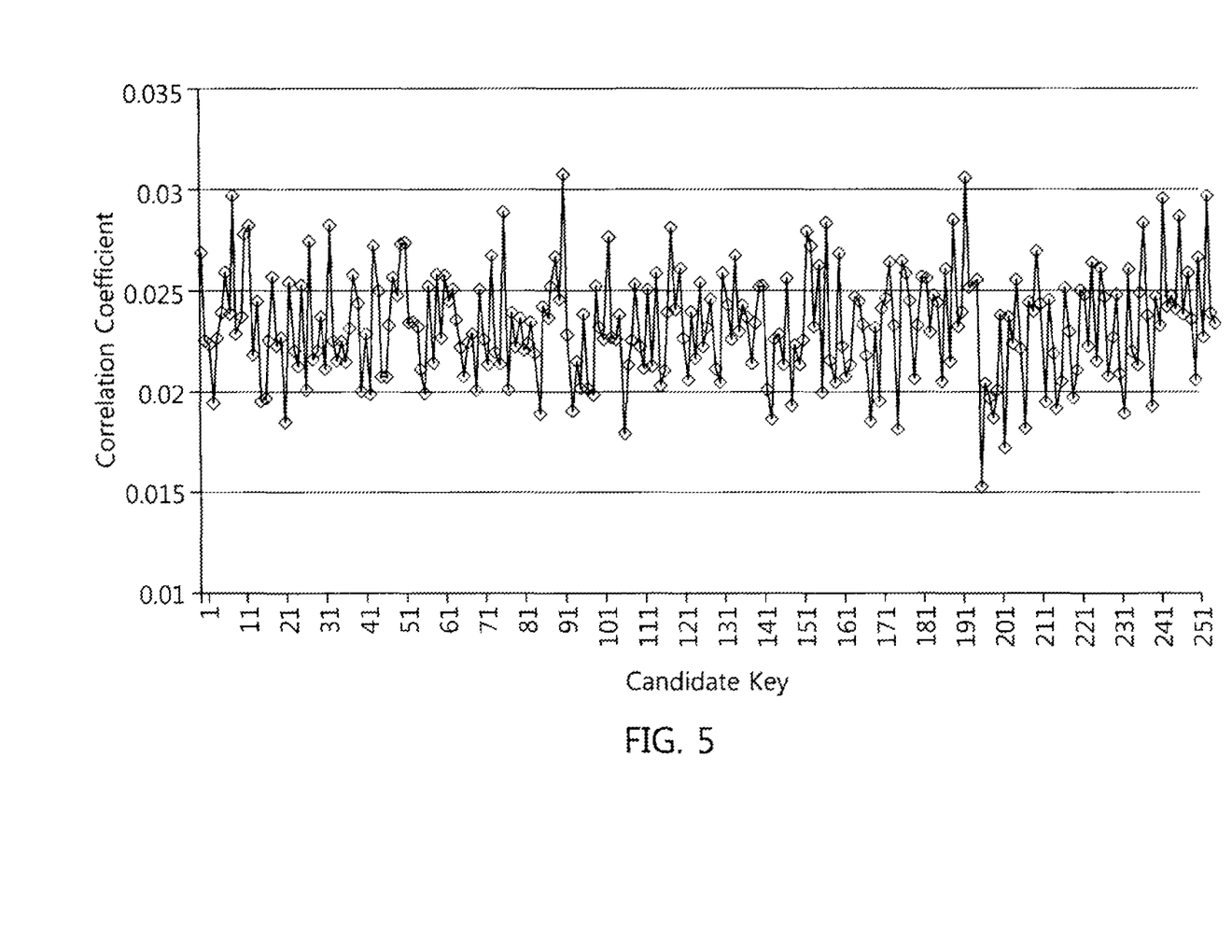
FIG. 5 is a graph illustrating correlation coefficients for the values of candidate keys when a differential power analysis attack was made on the low-power encryption algorithm according to the present invention.

FIG. 4 is a graph illustrating correlation coefficients for the values of candidate keys when a differential power analysis attack was made on a conventional low power encryption algorithm, and FIG. 5 is a graph illustrating correlation coefficients for the values of candidate keys when a differential power analysis attack was made on the low-power encryption algorithm according to the present invention.

Referring to FIG. 4, it can be seen that when the differential power analysis attack was made on the conventional low power encryption algorithm, the correlation at a value corresponding to the actual encryption key of the candidate keys is higher than those at values corresponding to the other encryption keys. In contrast, referring to FIG. 5, it can be seen that when the differential power analysis attack was made on the low-power encryption algorithm according to the present invention, the correlation at a value corresponding to the actual encryption key of the candidate keys is not higher than those at values corresponding to the other encryption keys.

The present invention has the advantage of enabling an encryption algorithm, capable of ensuring security against power analysis attacks using fewer resources, to be applied to a conventional low-power encryption apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A low-power plaintext encryption apparatus comprising:
   a plaintext input chip configured to receive from a user a plaintext P which is a concatenation of a plurality of sub-plaintexts each having a same length of bits;
   a mask value generation chip configured to generate a mask value M having a bit length identical to that of input round function values generated from the plurality of sub-plaintexts received from the plaintext input chip;
   a mask value application chip configured to generate first masking round function values by applying the mask value M to each of the input round function values;
   a round key application chip configured to generate second masking round function values by applying round key values to the first round function values;
   a mask operation chip configured to generate third masking round function values by performing a mask addition operation on the second masking round function values;
   a shift operation chip configured to generate fourth masking round function values by performing a circular shift operation on the third masking round function values;
   a shift operation correction chip configured to generate output round function values by performing an operation using the mask value M on the fourth masking round function values, and
   a plaintext output chip configured to output an encrypted plaintext P' having a same length of bits by concatenating the output round function values,
   wherein the input round function values are an input round function value $X_i[0]$, an input round function value $X_i[1]$, an input round function value $X_i[2]$, and an input round function value $X_i[3]$, wherein the mask value application chip:
  generates a first masking round function value $X_{i\_1}[0]$ from the input round function value $X_i[0]$ and the mask value M based on an equation "$X_{i\_1}[0]=X_i[0]\oplus M$";
  generates a first masking round function value $X_{i\_1}[1]$ from the input round function value $X_i[1]$ and the mask value M based on an equation "$X_{i\_1}[1]=X_i[1]\oplus M$";
  generates a first masking round function value $X_{i\_1}[2]$ from the input round function value $X_i[2]$ and the mask value M based on an equation "$X_{i\_1}[2]=X_i[2]\oplus M$"; and
  generates a first masking round function value $X_{i\_1}[3]$ from the input round function value $X_i[3]$ and the mask value M based on an equation "$X_{i\_1}[3]=X_i[3]\oplus M$";
  wherein $\oplus$ is an exclusive OR (XOR) operator, and
  wherein the round key values are a round key value $RK_i[0]$, a round key value $RK_i[1]$, a round key value $RK_i[2]$, a round key value $RK_i[3]$, a round key value $RK_i[4]$, and a round key value $RK_i[5]$.

2. The low-power encryption apparatus of claim 1, wherein the round key application chip:
  generates a second masking round function value $X_{i\_2}[0]$ from the first masking round function value $X_{i\_1}[0]$ and the round key value $RK_i[0]$ based on an equation "$X_{i\_2}[0]=X_{i\_1}[0]\oplus RK_i[0]$";
  generates a second masking round function value $X_{i\_2\_1}[1]$ from the first masking round function value $X_{i\_1}[1]$ and the round key value $RK_i[1]$ based on an equation "$X_{i\_2\_1}[1]=X_{i\_1}[1]\oplus RK_i[1]$";
  generates a second masking round function value $X_{i\_2\_2}[1]$ from the first masking round function value $X_{i\_1}[1]$ and the round key value $RK_i[2]$ based on an equation "$X_{i\_2\_2}[1]=X_{i\_1}[1]\oplus RK_i[2]$";
  generates a second masking round function value $X_{i\_2\_1}[2]$ from the first masking round function value $X_{i\_1}[2]$ and the round key value $RK_i[3]$ based on an equation "$X_{i\_2\_1}[2]=X_{i\_1}[2]\oplus RK_i[3]$";
  generates a second masking round function value $X_{i\_2\_2}[2]$ from the first masking round function value $X_{i\_1}[2]$ and the round key value $RK_i[4]$ based on an equation "$X_{i\_2\_2}[2]=X_{i\_1}[2]\oplus RK_i[4]$"; and
  generates a second masking round function value $X_{i\_2}[3]$ from the first masking round function value $X_{i\_1}[3]$ and the round key value $RK_i[5]$ based on an equation "$X_{i\_2}[3]=X_{i\_1}[3]\oplus RK_1[5]$."

3. The low-power encryption apparatus of claim 2, wherein the mask operation chip:
  generates a third masking round function value $X_{i\_3}[1]$ by performing the mask addition operation, satisfying an equation "$(A\oplus M)\odot(B\oplus M)=(A+B)\oplus M$," on the second masking round function value $X_{i\_2}[0]$ and the second masking round function value $X_{i\_2\_1}[1]$;
  generates a third masking round function value $X_{i\_3}[2]$ by performing the mask addition operation on the second masking round function value $X_{i\_2\_2}[1]$ and the second masking round function value $X_{i\_2\_1}[2]$; and
  generates a third masking round function value $X_{i\_3}[3]$ by performing the mask addition operation on the second masking round function value $X_{i\_2\_2}[2]$ and the second masking round function value $X_{i\_2}[3]$;
  wherein $\odot$ is a mask addition operator, and each of $A\oplus M$ and $B\oplus M$ is a second masking round function value to which the mask value M has been applied.

4. The low-power encryption apparatus of claim 3, wherein the shift operation chip:
  generates a fourth masking round function value $X_{i\_4}[1]$ from the third masking round function value $X_{i\_3}[1]$ based on an equation "$X_{i\_4}[1]=ROL_9(X_{i\_3}[1])$";
  generates a fourth masking round function value $X_{i\_4}[2]$ from the third masking round function value $X_{i\_3}[2]$ based on an equation "$X_{i\_4}[2]=ROR_5(X_{i\_3}[2])$"; and
  generates a fourth masking round function value $X_{i\_4}[3]$ from the third masking round function value $X_{i\_3}[3]$ based on an equation "$X_{i\_4}[3]=ROR_3(X_{i\_3}[3])$";
  wherein $ROL_a(x)$ is a function that circularly shifts "x" to a left by "a" bits and then outputs a result, and $ROR_a(x)$ is a function that circularly shifts "x" to a right by "a" bits and then outputs a result.

5. The low-power encryption apparatus of claim 4, wherein the shift operation correction chip:
  generates an output round function value $X_{i+1}[0]$ from the fourth masking round function value $X_{i\_4}[1]$ and the mask value M based on an equation "$X_{i+1}[0]=X_{i\_4}[1]\oplus\{M\oplus ROL_9(M)\}$";
  generates an output round function value $X_{i+1}[1]$ from the fourth masking round function value $X_{i\_4}[2]$ and the mask value M based on an equation "$X_{i+1}[1]=X_{i\_4}[2]\oplus\{M\oplus ROR_5(M)\}$";
  generates an output round function value $X_{i+1}[2]$ from the fourth masking round function value $X_{i\_4}[3]$ and the mask value M based on an equation "$X_{i+1}[2]=X_{i\_4}[3]\oplus\{M\oplus ROR_3 M\}$"; and
  generates an output round function value $X_{i+1}[3]$ from the first masking round function value $X_{i\_1}[0]$ based on an equation "$X_{i+1}[3]=X_{i\_1}[0]$."

6. A low-power encryption method comprising:
  receiving, by a plaintext input chip, from a user a plaintext P which is a concatenation of a plurality of sub-plaintexts each having a same length of bits;
  generating, by a mask value generation chip, a mask value M having a bit length identical to that of input round function values generated from the plurality of sub-plaintexts received from the plaintext input chip;
  generating, by a mask value application chip, first masking round function values by applying the mask value M to each of the input round function values;
  generating, by a round key application chip, second masking round function values by applying round key values to the first round function values;
  generating, by a mask operation chip, third masking round function values by performing a mask addition operation on the second masking round function values;
  generating, by a shift operation chip, fourth masking round function values by performing a circular shift operation on the third masking round function values;
  generating, by a shift operation correction chip, output round function values by performing an operation using the mask value M on the fourth masking round function values, and
  outputting, by a plaintext output chip, an encrypted plaintext P' having a same length of bits by concatenating the output round function values,
  wherein the input round function values are an input round function value $Xi[0]$, an input round function value $X_i[1]$, an input round function value $X_i[2]$, and an input round function value $X_i[3]$,
  wherein generating the first masking round function values includes:
    generating a first masking round function value $X_{i\_1}[0]$ from the input round function value $X_i[0]$ and the mask value M based on an equation "$X_{i\_1}[0]=X_i[0]\oplus M$";
    generating a first masking round function value $X_{i\_1}[1]$ from the input round function value $X_i[1]$ and the mask value M based on an equation "$X_{i\_1}[1]=X_i[1]\oplus M$";

generating a first masking round function value $X_{i\_1}[2]$ from the input round function value $X_i[2]$ and the mask value M based on an equation "$X_{i\_1}[2]=X_i[2]\oplus M$"; and generating a first masking round function value $X_{i\_1}[3]$ from the input round function value $X_i[3]$ and the mask value M based on an equation "$X_{i\_1}[3]=X_i[3]\oplus M$";

wherein $\oplus$ is an XOR operator, and wherein the round key values are a round key value $RK_i[0]$, a round key value $RK_i[1]$, a round key value $RK_i[2]$, a round key value $RK_i[3]$, a round key value $RK_i[4]$, and a round key value $RK_i[5]$.

7. The low-power encryption method of claim 6, wherein generating the second masking round function values includes:

generating a second masking round function value $X_{i\_2}[0]$ from the first masking round function value $X_{i\_1}[0]$ and the round key value $RK_i[0]$ based on an equation "$X_{i\_2}[0]=X_{i\_1}[0]\oplus RK_i[0]$";

generating a second masking round function value $X_{i\_2\_1}[1]$ from the first masking round function value $X_{i\_1}[1]$ and the round key value $RK_i[1]$ based on an equation "$X_{i\_2\_1}[1]=X_{i\_1}[1]\oplus RK_i[1]$";

generating a second masking round function value $X_{i\_2\_2}[1]$ from the first masking round function value $X_{1\_1}[1]$ and the round key value $RK_i[2]$ based on an equation "$X_{i\_2\_2}[1]=X_{i\_1}[1]\oplus RK_i[2]$";

generating a second masking round function value $X_{i\_2\_1}[2]$ from the first masking round function value $X_{i\_1}[2]$ and the round key value $RK_i[3]$ based on an equation "$X_{i\_2\_1}[2]=X_{i\_1}[2]\oplus RK_i[3]$";

generating a second masking round function value $X_{i\_2\_2}[2]$ from the first masking round function value $X_{i\_1}[2]$ and the round key value $RK_i[4]$ based on an equation "$X_{i\_2\_2}[2]=X_{i\_1}[2]\oplus RK_i[4]$"; and generating a second masking round function value $X_{i\_2}[3]$ from the first masking round function value $X_{i\_1}[3]$ and the round key value $RK_i[5]$ based on an equation "$X_{i\_2}[3]=X_{i\_1}[3]\oplus RK_i[5]$."

8. The low-power encryption method of claim 7, wherein generating the third masking round function values includes:

generating a third masking round function value $X_{i\_3}[1]$ by performing the mask addition operation, satisfying an equation "$(A\oplus M)\lfloor(B\oplus M)=(A+B)\oplus M$," on the second masking round function value $X_{i\_2}[0]$ and the second masking round function value $X_{i\_2\_1}[1]$;

generating a third masking round function value $X_{i\_3}[2]$ by performing the mask addition operation on the second masking round function value $X_{i\_2\_2}[1]$ and the second masking round function value $X_{i\_2\_1}[2]$; and generating a third masking round function value $X_{i\_3}[3]$ by performing the mask addition operation on the second masking round function value $X_{i\_2\_2}[2]$ and the second masking round function value $X_{i\_2}[3]$;

wherein $\odot$ is a mask addition operator, and each of $A\oplus M$ and $B\oplus M$ is a second masking round function value to which the mask value M has been applied.

9. The low-power encryption method of claim 8, wherein generating the fourth masking round function values includes:

generating a fourth masking round function value $X_{i\_4}[1]$ from the third masking round function value $X_{i\_3}[1]$ based on an equation "$X_{1\_4}[1]=ROL_9(X_{i\_3}[1])$";

generating a fourth masking round function value $X_{i\_4[2]}$ from the third masking round function value $X_{i\_3}[2]$ based on an equation "$X_{i\_4}[2]=ROR_5(X_{i\_3}[2])$"; and generating a fourth masking round function value $X_{i\_4}[3]$ from the third masking round function value $X_{i\_3[3]}$ based on an equation "$X_{i\_4}[3]=ROR_3(X_{i\_3}[3])$";

wherein $ROL_a(x)$ is a function that circularly shifts "x" to a left by "a" bits and then outputs a result, and $ROR_a(x)$ is a function that circularly shifts "x" to a right by "a" bits and then outputs a result.

10. The low-power encryption method of claim 9, wherein generating the output round function values includes:

generating an output round function value $X_{i+1}[0]$ from the fourth masking round function value $X_{i\_4}[1]$ and the mask value M based on an equation "$X_{i+1}[0]=X_{i\_4}[1]\oplus\{M\oplus ROL_9(M)\}$";

generating an output round function value $X_{i+1}[1]$ from the fourth masking round function value $X_{i\_4}[2]$ and the mask value M based on an equation "$X_{i+1}[1]=X_{i\_4}[2]\oplus\{M\oplus ROR_5(M)\}$";

generating an output round function value $X_{i+1}[2]$ from the fourth masking round function value $X_{i\_4}[3]$ and the mask value M based on an equation "$X_{i+1}[2]=X_{i\_4}[3]\oplus\{M\oplus ROR_3 M\}$"; and generating an output round function value $X_{i+1}[3]$ from the first masking round function value $X_{i\_1}[0]$ based on an equation "$X_{i+1}[3]=X_{i\_1}[0]$."

* * * * *